United States Patent

Kear et al.

(10) Patent No.: US 6,723,387 B1
(45) Date of Patent: Apr. 20, 2004

(54) MULTIMODAL STRUCTURED HARDCOATINGS MADE FROM MICRO-NANOCOMPOSITE MATERIALS

(75) Inventors: Bernard H. Kear, Whitehouse Station, NJ (US); Ganesh Skandan, Piscataway, NJ (US)

(73) Assignee: Rutgers University, Piscataway, NJ (US)

( * ) Notice: Subject to any disclaimer, the term of this patent is extended or adjusted under 35 U.S.C. 154(b) by 0 days.

(21) Appl. No.: 10/049,577

(22) PCT Filed: Aug. 16, 2000

(86) PCT No.: PCT/US00/22340

§ 371 (c)(1),
(2), (4) Date: Sep. 19, 2002

(87) PCT Pub. No.: WO01/12431

PCT Pub. Date: Feb. 22, 2001

Related U.S. Application Data (60) Provisional application No. 60/149,128, filed on Aug. 16, 1999.

(51) Int. Cl.[7] .............................. C23C 4/06; C23C 4/10; C23C 29/00
(52) U.S. Cl. ........................ 427/450; 427/451; 427/452; 427/453; 427/455; 427/456; 75/230; 75/232; 75/235; 75/236; 75/240; 75/244; 75/245; 75/246; 419/10; 419/12; 419/13; 419/14; 419/18; 419/19; 419/32; 106/287.34; 106/286.8; 264/109
(58) Field of Search ................... 427/450, 451, 427/452, 453, 455, 456; 75/230, 236, 240, 244, 245, 246, 232, 235; 428/552, 565, 688, 689, 539.5; 419/10, 12, 13, 14, 18, 19, 32; 106/286.8, 287.34; 264/109

(56) References Cited

U.S. PATENT DOCUMENTS

| | | | |
|---|---|---|---|
| 5,120,693 A | * | 6/1992 | Connolly et al. .............. 502/64 |
| 5,230,729 A | | 7/1993 | McCandlish et al. ......... 75/351 |
| 5,514,350 A | | 5/1996 | Kear et al. ................... 422/198 |
| 5,651,808 A | | 7/1997 | McCandlish et al. ......... 75/252 |
| 5,876,683 A | | 3/1999 | Glumac et al. ............. 423/325 |
| 5,880,382 A | | 3/1999 | Fang et al. |
| 5,919,428 A | | 7/1999 | Gao et al. ................... 423/440 |
| 6,025,034 A | | 2/2000 | Strutt et al. ................. 427/450 |

FOREIGN PATENT DOCUMENTS

| | | | |
|---|---|---|---|
| WO | WO97/18341 | | 5/1997 |
| WO | 97/18341 | * | 5/1997 |

* cited by examiner

Primary Examiner—Katherine A. Bareford
(74) Attorney, Agent, or Firm—Duane Morris LLP (57) ABSTRACT

A thermal spray method for the fabrication of ceramic/metal and ceramic/ceramic hardcoating for wear applications. The method makes use of feedstock powder, composed of micron-scale aggregates of hard phase material particles that are either mixed or coated with a readily fusible nano-scale binder phase material. Thus, during thermal spraying, the nanostructured material undergoes rapid melting while the aggregated material is heated but not necessarily melted. A dense coating is formed when the molten nano-material fills the available pore spaces between the heated and softened aggregates, providing a strong and tough matrix for the consolidated material. Optimal wear properties are achieved when the volume fraction of aggregated particles is high, typically in the range of 0.5–0.9. Aggregated material may be composed of one, two or more particles of difference sizes and/or compositions, with particle size distribution that gives high packing density for the hard phase.

26 Claims, 6 Drawing Sheets

MULTIMODAL STRUCTURED HARDCOATINGS MADE FROM MICRO-NANOCOMPOSITE MATERIALS

This application is a National Stage of International Application No. PCT/US00/22340, filed on Aug. 16, 2000, published in English, which claims the benefit of U.S. Provisional Application No. 60/149,128 filed on Aug. 16, 1999.

FIELD OF THE INVENTION

The present invention relates to hardcoatings primarily for use in wear applications and methods for fabricating same by thermal spraying of powder feeds and more particularly to multimodal coatings which are fabricated by thermal spraying aggregated micro/nano-scale feedstock powders.

BACKGROUND OF THE INVENTION

Materials with fine-scale structures have long been recognized to exhibit remarkable and technologically attractive properties. Over the past decade, interest has been growing in a new class of materials known as nano-scale materials, that are composed of ultra-fine grains or particles. A feature of nano-scale materials is the high fraction of atoms that reside at grain boundaries or interfaces in the materials, which can have a beneficial effect on properties. Although much of today's research and development activity is focused on the synthesis and processing of nano-scale bulk materials, there is a growing interest in the fabrication of nano-scale coatings.

Conventional WC/Co powders, having 3–30 wt. % Co, are routinely produced by mechanically milling micron-scale powders of phase pure WC and Co. The difficulty associated with uniformly mixing such powders by mechanical means has heretofore limited the WC grain size of the product powder to about 0.1–0.3 micron. More recently, an alternative chemical processing technology, known in the art as Spray Conversion Processing (SCP) has been developed for producing nano-scale WC/Co powder as described in U.S. Pat. No. 5,230,729, U.S. Pat. No. 5,651,808, and U.S. Pat. No. 5,919,428, all of which are assigned to Nanodyne, Inc. (now Union Miniere). In SCP, two phases are ideally mixed at a scale less than 0.1 micron. In addition to nanophase WC/Co, SCP enables a wide variety of other technically important nano-scale metal carbide/metal systems to be produced, such as Cr3C2/NiCr and TiC/Fe.

The SCP production method involves essentially three sequential steps: (1) aqueous solution mixing of ammonium metatungstate (source of tungsten) and cobalt acetate (source of cobalt) to fix the composition of a starting solution, (2) spray drying the starting solution to generate a chemically homogeneous precursor powder, and (3) fluid-bed thermochemical conversion (pyrolysis, reduction and carburization) of the precursor powder to a nano-scale WC/Co powder end-product. A feature of the asynthesized nano-scale powder is its characteristic spherical-shell morphology, which is obtained via the spray drying step of the process. Another feature is that each shell-like or hollow particle is highly porous in nature, and is composed of a completely uniform mixture of WC and Co nano-scale grains, typically with a WC grain size of about 30 nm.

Recent work has demonstrated that asynthesized nano-scale WC/Co powder, can be used directly as feedstock material in thermal spraying.

Alternatively, the powder can be re-processed into solid agglomerates, as taught in U.S. Pat. No. 6,025,034, which gives some advantages in terms of coating quality, e.g. reduced porosity. Powder re-processing involves mechanically milling the asynthesized nano-scale WC/Co powder in an appropriate fluid medium, which breaks up the shell-like particles (10–30 micron diameter) into much smaller fragments (0.1–1 micron diameter). The slurry formed by milling is spray dried to form solid nano-scale particle agglomerates (5–40 micron diameter). In current practice, asynthesized nano-scale WC/Co powders (hollow particles or solid agglomerates) are used as feedstock powders in high velocity oxy-fuel (HVOF) spraying of nano-scale WC/Co coatings. Unfortunately, asynthesized nano-scale WC/Co powders can not be used as feedstock powders in plasma spraying because plasma spraying causes extensive decarburization of the WC phase, due to the much higher temperatures achieved during spraying.

Oxide-ceramic powders with fine and ultra-fine particles sizes have traditionally been produced by solution/precipitation methods, however, recent development work has focused on vapor condensation methods. Pioneering work in this field has resulted in the Inert Gas Condensation (IGC) process. In this process, which is conducted in a low pressure (typically 1–30 mbar) inert gas environment, nano-scale particles are produced in a thermalizing zone just above the evaporative source, due to interactions between the hot vapor species and the much colder inert gas atoms in the chamber. The particles are convectively transported to and collected on a water-cooled copper plate. Today, the ICG process is widely used in the production of metal powders, and some metal-oxide powders.

In the past few years, significant modifications to the basic ICG process have been made in order to produce nano-scale powders from readily available metalorganic precursors. The modified ICG, called Chemical Vapor Condensation (CVC), a precursor/carrier gas stream is decomposed in a hot-wall or combustion-flame reactor to generate a stream of nano-scale particles exiting the hot zone of the reactor as described in U.S. Pat. Nos. 5,514,350 and 5,876,683. The CVC process has been used to produce nano-scale ceramic powders, which cannot easily be produced by the IGC process, because of the high melting points and/or low vapor pressures of the starting materials. Both hot-wall and combustion-flame reactor systems are now being developed for high rate powder production of oxide and non-oxide ceramic nano-scale powders. Product powders available today include $Al_2O_3$, $TiO_2$, $ZrO_2$, SiC, $Si_3N_4$, AlN and mixtures thereof.

Comparison tests, using both conventional and nano-scale $Al_2O_3/TiO_2$ feedstock powders, have shown that coatings obtained by plasma spraying of nano-scale powders display a modest increase in hardness, but a significant improvement in wear properties.

Accordingly, improved nano-scale ceramic/metal and ceramic/ceramic coatings and methods for making same are needed for wear applications.

SUMMARY OF THE INVENTION

A method for producing an abrasion resistant coating composed of a ceramic/metal material system or a ceramic/ceramic material system, the method comprising the steps of: blending micron-scale particles of a hard phase material with nano-scale particles of a binder phase material to form a uniform powder mixture; aggregating of the powder mixture to bond the nano-scale particles to the micron-scale particles thereby forming a feedstock powder comprised of particle aggregates; and thermal spraying the feedstock powder of particle aggregates onto a substrate thereby forming the abrasion resistant coating thereon. Coatings produced by this method are composed of micron-scale particles of the hard phase material fused together with the binder phase material.

BRIEF DESCRIPTION OF THE INVENTION

The advantages, nature, and various additional features of the invention will appear more fully upon consideration of the illustrative embodiments now to be described in detail in connection with accompanying drawings wherein.

DETAILED DESCRIPTION OF THE INVENTION

Figure 1:
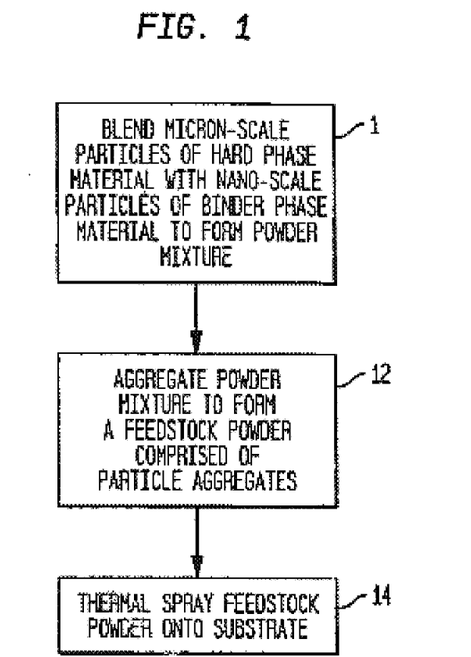
FIG. 1 shows a block diagram of a method for fabricating ceramic/metal and ceramic/ceramic multimodal coatings according to the present invention.

FIG. 1 is a block diagram of a method for fabricating ceramic/metal and ceramic/ceramic multimodal coatings according to the present invention. The coatings are especially useful for wear applications as they exhibit increased abrasion wear resistance while maintaining a reasonable hardness. The first step of the method shown in block 10, involves blending micron-scale (coarse or coarse/fine) particles of a hard phase material with readily fusible nano-scale (ultrafine) particles of a binder phase material to form a powder mixture.

The micron-scale particles of hard phase starting material typically comprise a ceramic or a ceramic/metal composite material in aggregate or non-aggregate form. Aggregated particles are clusters of bonded together particles that cannot be easily separated from one another by mechanical means. The nano-scale binder phase starting material typically comprises metal particles, ceramic particles or ceramic/metal composite particles.

Figures 2A, 2B:
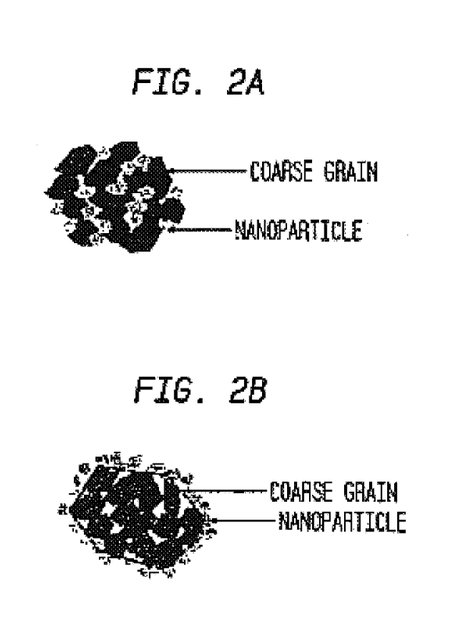
FIGS. 2A and 2B show two types of coarse and fine-grained mixtures.

If the powder mixture employs non-aggregated particles of hard phase starting material, the powder mixture is then agglomerated using any suitable well known particle agglomeration method, such as spray drying, to form particle agglomerates of intimately mixed micron-scale particles of hard phase material and nano-scale particles of binder phase material as shown in FIG. 2A. Agglomerated particles differ from aggregated particles in that they are capable of being mechanically separated from one another.

The powder mixture is not agglomerated if the powder mixture employs aggregated particles of hard phase starting material. FIG. 2B, shows a particle aggregate of hard phase material after blending with the nano-scale particles of binder phase material. As can be seen, the particle aggregate of micron-scale hard ceramic particles is coated with the nano-scale particles of binder phase material.

In block 12, the powder mixture of hard phase/binder phase particle agglomerates (FIG. 2A) or binder phase coated hard phase particles aggregates (FIG. 2B) is heat treated to bond the nano-scale particles to the surfaces of the micron-scale particles. The blended powder is heated in a furnace at an appropriate temperature between 900° C. and 1500° C. and in a suitable gas atmosphere such as Ar, $CH_4/H_2$. This step produces a feedstock powder comprised of particle aggregates, which are typically about 5–40 microns in size and suitable for thermal spraying.

Finally in block 14, the aggregated feedstock powder is thermally sprayed onto a substrate under controlled conditions. Typically, a high velocity oxy-fuel (HVOF) thermal spray gun is used for spraying ceramic/metal coatings. Powders are fed into the gun at a predetermined rate, such rates being well known to ordinary skilled artisans. A plasma torch is used for spraying ceramic/ceramic coatings became of the need to go to a higher temperature. Thermal spraying selectively melts the nano-scale particles of the aggregates, while the micron-scale particles of the aggregates are heated but not necessarily melted. Specifically, the melted nanoscale particles become a liquid phase binder material that fills the available pore spaces between the heated and softened micron-scale particles hard phase material, hence forming a dense coating on the substrate. Once cooled, the binder phase material provides a strong and tough matrix for the hard phase particles while simultaneously ensuring good bonding between coating and substrate and between the individual splats of in the coating.

The thermal spraying step of the method of the invention can be performed using any conventional thermal spraying process that is suitable for the particular aggregated feedstock powder being used. For example, aggregated feedstock powders of ceramic/metal systems, such as WC/Co, can be thermal sprayed using conventional high velocity oxy-fuel (HVOF) techniques. Aggregated feedstock powders of ceramic/ceramic systems, such as $Al_2O_3$/TiO2, can be thermal sprayed using conventional plasma spray techniques. The choice of operating system for these two different classes of materials is dictated by considerations that are well-known in the thermal spray industry. For example, the lower temperatures and shorter particle residence times characteristic of HVOF spraying enables WC/Co to be spray deposited without causing significant decarburization of the WC phase. Decarburization is recognized to be undesirable because it has an adverse effect on coating properties and performance.

The materials systems that are applicable to the method of the invention include a wide variety of ceramic/metal composite materials, such as WC/Co, $Cr_3C_2$/NiCr and TiC/Fe, and ceramic/ceramic composite materials, such as $Al_2O_3$, YSZ (yttria-stabilized zirconia), $Al_2O_3$/$TiO_2$, $ZrO_2$/$Y_2O_3$, $ZrO_2$/$Y_2O_3$—$Al_2O_3$, $Cr_2O_3$, $Cr_2O_3$/$SiO_2$. The nano-scale binder phase materials used in the aggregated feedstock powder of the invention can be from virtually any source as purity of the material is not critical. Further, applicable feedstock powders can include any mixture of micron-scale hard phase material and nano-scale binder phase material. Some examples are shown below in Table I. The aggregated feedstock powder can be composed of one, two or more hard phase material particles of different sizes and/or compositions, with a particle size distribution that will provide a high packing density of hard phase material particles in the binder phase material. In one embodiment, the aggregated feedstock powder can comprise a bimodal composite structure which includes, for example, a 70:30 mixture of coarse particles of hard phase material (5–30 microns) and ultra-fine nano-scale particles or grains of binder phase material (less than 0.1 micron). In another embodiment, the aggregated feedstock powder can comprise a trimodal composite structure which includes, for example, a mixture of coarse particles of hard phase material (5–30 micron), fine particles of hard phase material (0.1–5 micron), and ultra-fine nanoscale particles or grains of binder phase material (less than 0.1 micron). Further, the composite structure can be made up of materials of different compositions. More complex multimodal structures can be envisioned, particularly when the hard phase material constituents in the aggregate particle mass are of different compositions.

TABLE I

WC/12Co (coarse) plus WC/12Co (nano): average composition WC/12Co
WC/12Co (coarse) plus WC/5Co (nano): average composition WC/9.9Co
WC/6Co (coarse) plus WC/12Co (nano): average composition WC/7.8Co
WC/8Co (coarse) plus WC/5Co (nano): average composition WC/7.1Co
WC/1Co (coarse) plus WC/12Co (nano): average composition WC/4.3Co
$Al_2O_3$ - phase pure (coarse) plus $Al_2O_3$ -phase pure (nano)
$Al_2O_3$ - phase pure (coarse) plus $Al_2O_3$ /$TiO_2$ (nano)
$Al_2O_3$ /$TiO_2$ (coarse) plus $Al_2O_3$/$TiO_2$ (nano)
Carbides and nitrides (coarse) plus metals (nano)

Aggregate composite systems are well-known in the materials engineering field. An example is concrete, which consists of a mixture of a coarse aggregate such as gravel, a fine aggregate such as sand, and a binder phase such as cement When water is added to the cement (calcium alumino-silicate) a complex series of hydration reactions occurs, which binds the aggregates into a solid. By mixing large and small particles, the volume fraction of hardening or reinforcing phase can be increased because the smaller particles can fit into the cavities (interstices) between the larger particles. Typical total aggregate (fine plus coarse) volume fractions in concrete are 0.60–0.75. The aggregated particles markedly increase the compressive strength of the concrete and reduce its cost. Since the aggregated particles are nearly spherical in shape and are mixed randomly, concrete displays near isotropic properties, i.e. the properties are equivalent in all directions. Moreover, the properties can be modified by the use of a variety of admixtures, which include surface hardeners and bonding agents. Other examples of aggregate composites are W/Cu, SiC/Al, and filled polymers.

Unlike the conventional aggregated composites described above, the aggregated feedstock powders of the present invention are designed for use in combustion-flame or arc-plasma spray guns, where particle residence times in the hot zones of the high velocity gas streams are very short, measured in milliseconds. Moreover, conventional aggregate composites do not employ the present invention's readily fusible nano-scale binder phase material which serves to bond the aggregated material into a dense coating.

Figure 3:
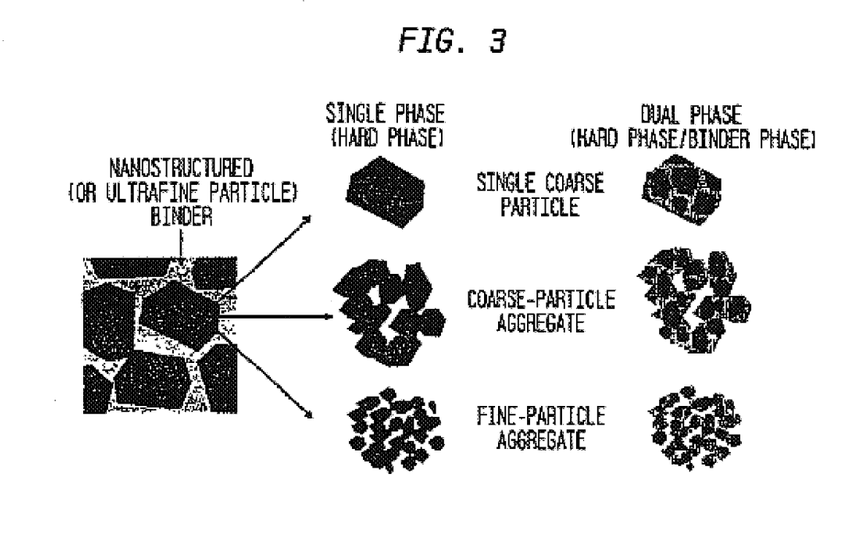
FIG. 3 shows a schematic of a dense coating formed by spraying different combinations of coarse and fine powders.

FIGS. 3A and 3B schematically show the dense coatings formed by spraying the aggregated feedstock powders of the invention. Optimal wear properties are achieved when the volume fraction of hard phase particles in the aggregate is high, typically in the range 0.5–0.9.

In the various tests to be described, a HVOF gun was used for thermal spraying of ceramic/metal systems, whereas a plasma gun was used for thermal spraying of ceramic/ceramic systems. All tests were conducted using WC/Co aggregated feedstock powders in an ambient air environment. Argon shrouding was used when spraying WC/Co aggregated feedstock powder in order to preclude oxidation of the coating material.

The materials were characterized by standard metallographic, SEM and X-ray diffraction methods. Hardness measurements were performed on polished sections of powder particles and coatings. In the case of the latter, both transverse and in-plane sections were examined, since it is known that crack propagation around the hardness indentation is more extensive in in-plane sections, because of the relatively weak interfaces between the splat-quenched layers in the coating.

Figure 4:
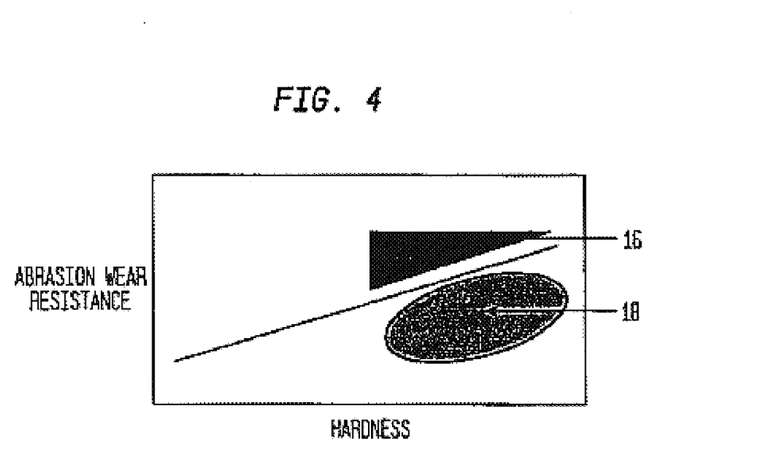
FIG. 4 shows a chart that compares the abrasion wear resistance of conventional WC/Co coatings with the abrasion wear resistance of multimodal WC/Co coatings of the present invention.

FIG. 4 compares the abrasion wear resistance of conventional WC/Co coatings with the abrasion wear resistance of multimodal WC/Co coatings of the present invention. The abrasion wear resistance of the conventional WC/Co coatings falls in band 18 and the abrasion wear resistance of multimodal WC/Co coatings of the present invention falls in band 16. As can be seen, the abrasion wear resistance of the conventional WC/Co coatings, like most other materials, scales with hardness, i.e. the higher the hardness, the greater the abrasion wear resistance. However, the abrasion wear resistance of the multimodal coatings of the present invention advantageously exhibit increased abrasion wear resistance while maintaining a reasonable hardness. This is accomplished in the present invention by manipulating the structure of the starting feedstock powder in the manner described above which provides a strong and tough matrix that holds the coarse particles together.

EXAMPLE #1

Feedstock Powder Structure 1

WC particles with a particle size of 2–3 microns were mixed with cobalt powder to achieve a composition of WC/12Co. 70 wt. % of this powder was mixed with 30 wt. % of ball milled nano-scale particles of the same composition, WC/12Co. The particular nano-scale material used in this example is marketed by Nanodyne (now Union Miniere) under the Tradename Nanocarb®. The individual ball milled particles of Nanocarb® were in the size range of 0.1 to 5 microns, and consisted of several nanocrystals of WC, ~50 nm in diameter. A unique feature of Nanocarb® is that the WC and Co phases are intimately mixed. To those skilled in the art, it will be apparent that for the purposes of this invention, it is not necessary to use Nanocarb®, and that any alternative source of a nanocrystalline material will suffice.

Figure 5A:
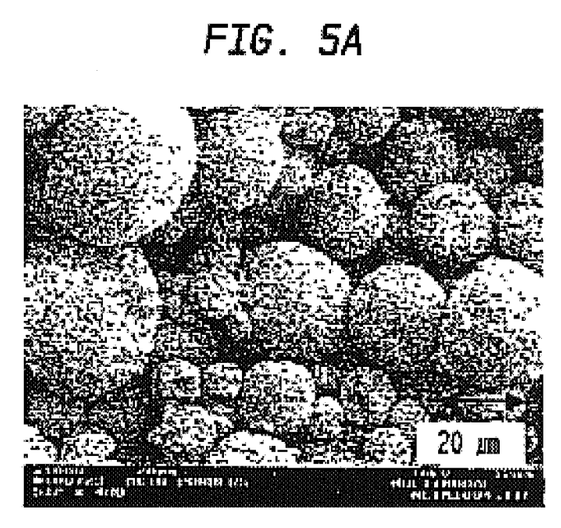
FIG. 5A shows a SEM micrograph that illustrates the morphology of a first multimodal powder structure according to the present invention under low magnification (×1,000)
Figure 5B:
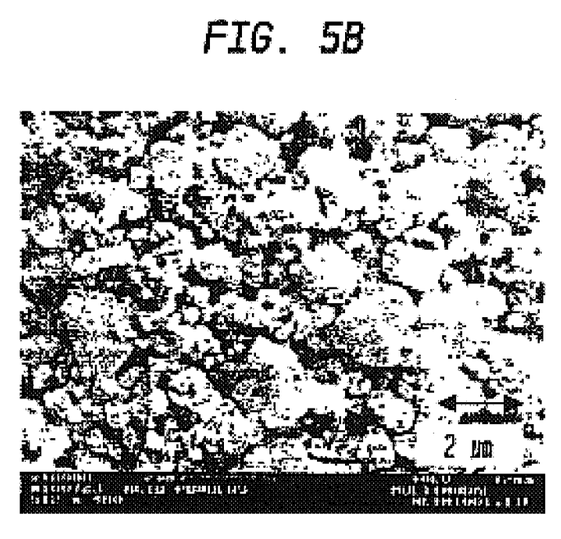
FIG. 5B shows a SEM micrograph that illustrates the morphology of the first multimodal powder structure under high magnification (×10,000)

The above powder blend was spray dried and heat treated to form an aggregated feedstock powder with a size range between 5–40 microns. FIGS. 5A and 5B are SEM micrographs of the multimodal powder morphology. FIG. 5A shows the multimodal powder morphology under low magnification (×1,000) and FIG. 5B shows the multimodal powder morphology under high magnification (×10,000). The coarse and fine particles are clearly visible.

Figure 6A:
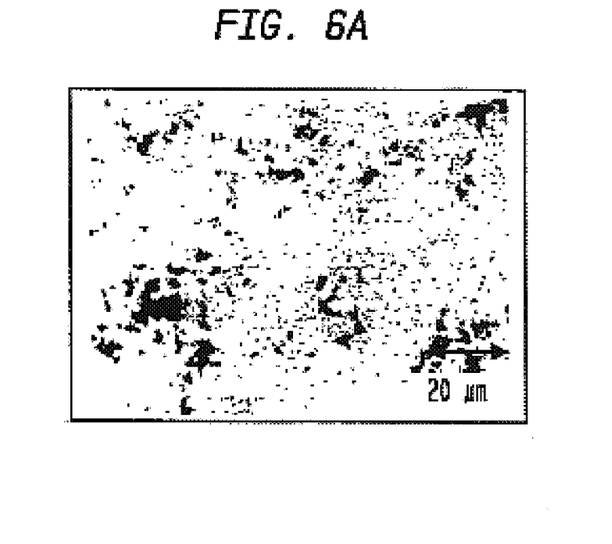
FIG. 6A shows an optical micrograph illustrating a polished surface of the multimodal coating of the invention.
Figure 6B:
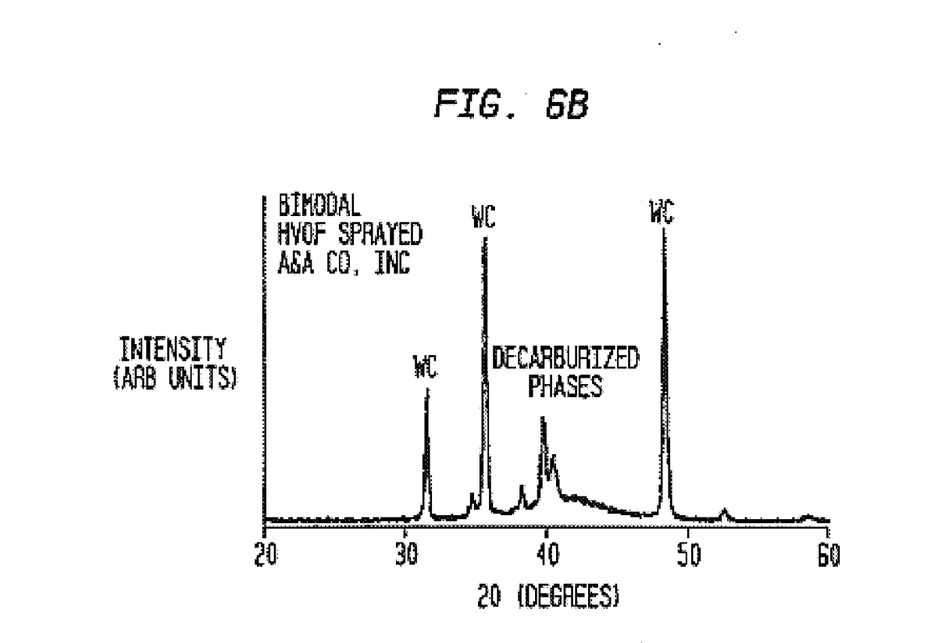
FIG. 6B shows an X-ray diffraction of the coating of FIG. 6A.

The aggregated feedstock powder was thermal sprayed onto carbon steel substrates using a DJ2700 thermal spray gun. FIG. 6A is an optical micrograph of a polished surface of the resulting multimodal coating, and FIG. 6B is a corresponding X-ray diffraction of the coating showing that a small amount of decarburization has occurred. The abrasion wear resistance of this coating measured $2.0 \times 10^2$ $Nm/mm^3$. A similar test on a conventional coarse grained material gave a wear resistance of only $1.4 \times 10^2$ $Nm/mm^3$. The significant enhancement in wear properties is attributed to the presence of a strong and tough matrix that holds the coarse WC particles together.

The concept of improving the abrasive wear resistance by blending micron-scale and nano-scale particles can be extended to other compositions. For example, the micron-scale component can have a composition ranging from WC/1Co to WC/12Co, while the nano-scale component can have a composition ranging from WC/5Co to WC/15Co. As a result, the average Co content can be as low as 4.1%. This gives the added benefit that the volume fraction of the hard phase is greater than usual, which is likely to lead to higher wear resistance.

Those skilled in the art will recognize that modifications to the composition of the Co matrix can be made by the addition of compounds such as VC and $Cr_3C_2$. Such additions give a reduction in melting point of the binder phase, which facilitates the formation of a dense coating.

In this example, a composition having a micron: nano ratio of 70:30 was selected because it exceeds the percolation threshold of the minor phase, i.e. the nano-grained material maintains its continuity. However, modifications to the ratio over a wider range can also lead to enhancement in the wear properties.

EXAMPLE #2

Feedstock Powder Structure 2

Powders of WC/12Co were obtained from a commercial source, which have a typical agglomerate size of 15–40 microns. Each agglomerate was composed of WC/Co particles with a carbide grain size of 2–5 microns. (WC/8Co can be used as well.) Nano-scale particles of binder phase material (Nanocarb®) with a composition of WC/5Co was milled in a conventional ball mill into particles in the range 0.1–5 microns. Each particle is composed of several nanocrystals of WC, ~50 nm in diameter. The two powders were homogeneously mixed in the ratio 70:30, the larger weight fraction being that of the micron-grain material (WC/12Co). The average Co content in the material was 9.9%. Subsequently, the mixed powders were heat treated at a temperature of 850° C. for 1 hour in an atmosphere of $H_2$ and $CH_4$.

Figure 7A:
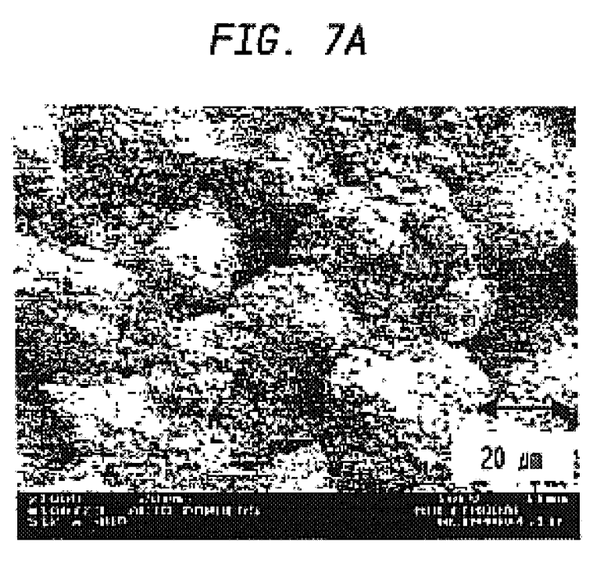
FIG. 7A shows a SEM micrograph that illustrates the morphology of a second multimodal powder structure according to the present invention under low magnification (×1,000)
Figure 7B:
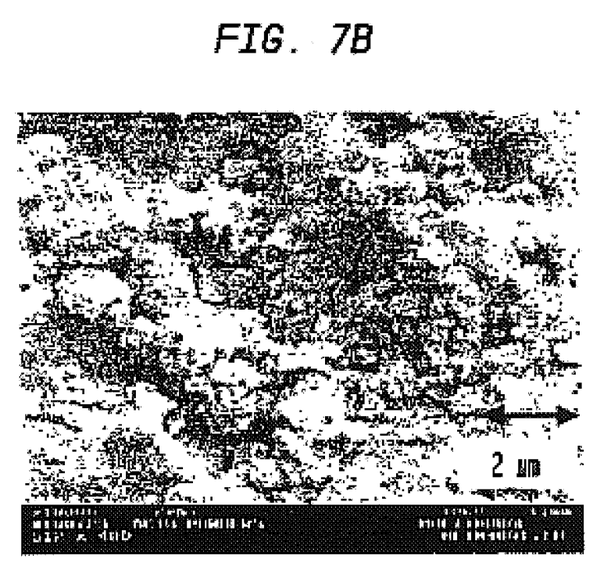
FIG. 7B shows a SEM micrograph that illustrates the morphology of the second multimodal powder structure under high magnification (×10,000)

FIGS. 7A and 7B are low and high magnification SEM images of the mixed and heat treated powders. These images clearly illustrate the coarse and fine particles. Heat treatment allows the nano-scale particles of binder phase material to sinter to the surface of the larger agglomerates of hard phase material. It should be noted that any combination of micron (WC/0Co–WC/12Co) and nano grain (WC/5Co–WC/15Co) compositions can be used to form HVOF thermal sprayed coatings.

Figure 8A:
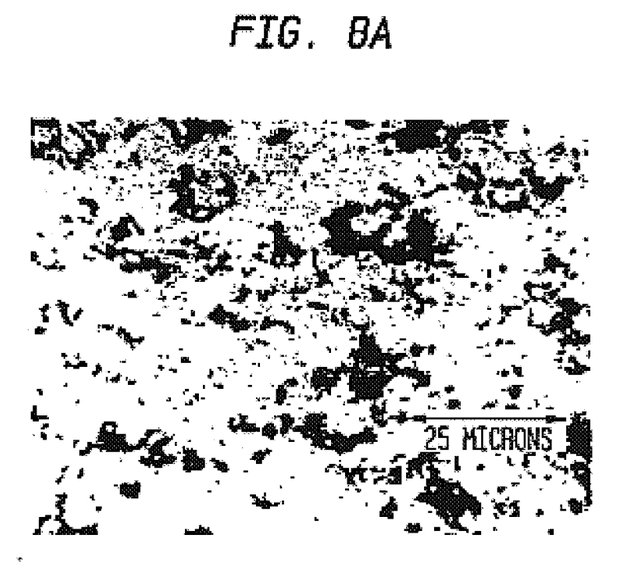
FIG. 8A shows an optical micrograph of the surface of a HVOF sprayed coating from mixed powders that were not heat treated.
Figure 8B:
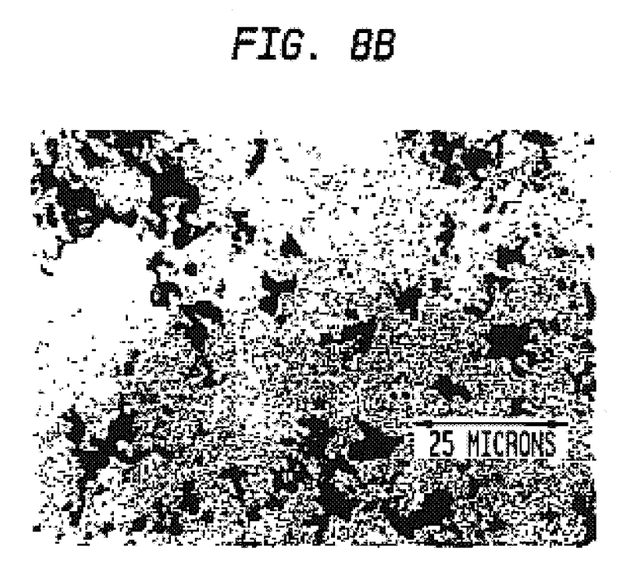
FIG. 8B shows an optical micrograph of the surface of a HVOF sprayed coating from mixed powders that were heat treated.

A non-heat treated powder sample (sample #1) and a heat treated powder sample (sample #2) were sprayed using standard DJ HVOF thermal spray gun. Coatings with thickness in the range 500–600 microns (~0.2 inches) were sprayed for both samples. The average hardness of Sample #1 was 750 VHN and that of Sample #2 was 800 VHN. The slight increase in hardness for the sintered powders is probably due to the increased density of the coating, as corroborated by the optical micrographs of the surface of the coatings, shown in FIGS. 8A and 8B. The optical micrograph of FIG. 8A is the non-heat treated sample #1 and the optical micrograph of FIG. 8B is the heat treated sample #2. Both samples were greater than 90% dense (i.e. 90% of the theoretical value).

Sample #1 had an abrasive wear resistance of $1.6 \times 10^2$ $Nm/mm^3$ and Sample #2 had an abrasive wear resistance of $2.5 \times 10^2$ $Nm/mm^3$. These numbers represent a 75% improvement over state-of-the-art thermal sprayed coatings of conventional WC/12Co materials.

Table II shown below, is a summary of characterization and wear data of the samples described in Examples 1 and 2. For purposes of comparison, three other WC/Co materials are also described.

TABLE II

| | Hardness ($VHN_{1kg}$) | Abrasive wear resistance ($\times 10^2$ $m/mm^3$) | Sliding wear resistance ($\times 10^6$ $Nm/mm^3$) | Amount of decarburization (%) |
|---|---|---|---|---|
| Multimodal Example 1 | 1100 | 2.0 | 5.3 | 12 |
| Multimodal Example 2 | 820 | 2.5 | 6.7 | 5 |
| Conventional coarse grained | 1080 | 1.4 | 4.5 | 5 |
| Ultrafine grained (0.2–0.3 μm) | 1150 | 1.2 | 3.7 | 15 |
| Nanocrystalline (0.03–0.05 μm) | 1150 | 0.9 | 3.7 | 30 |

EXAMPLE 3

WC/Co

WC/Co powders similar to those described in Examples 1 and 2 but with different compositions were produced. Similar improvements in wear properties as those described above were observed.

EXAMPLE 4

$Al_2O_3/TiO_2$

Multimodal feedstock powders of ceramic/ceramic composites were produced by blending coarse (~2 μm) $Al_2O_3$ with nano-scale particles of $Al_2O_3$ and $TiO_2$. The blended powder was spray dried and agglomerated into dense structures and plasma sprayed. The performance of the coating in terms of ductility and toughness was enhanced compared to a conventional coatings, resulting in enhanced wear resistance.

EXAMPLE 5

$Al_2O_3$

Multimodal feedstock powders of alumina ceramics were produced by blending (approximately 2 μm) $Al_2O_3$ with nanoscale particles of $Al_2O_3$. The blended powder was spray dried and agglomerated into a dense structure and plasma sprayed. The performance of the coating in terms of ductility and toughness was enhanced compared to conventional coatings.

As should now be apparent, coatings for wear applications having additional properties and performance advantages can be gained by blending pre-determined volume fractions of micro-scale and nano-scale powders in the feedstock powder used for thermal spraying. The use of such feedstock powders makes it possible to produce coatings with superior properties and performance for specific applications. For example, higher hardness and wear resistance for protective coatings in combustion and gas turbine engines, high optical transparency and toughness for aircraft canopies and radome structures, and enhanced ballistic impact strength for armor plates.

While the foregoing invention has been described with reference to the above embodiments, various modifications and changes can be made without departing from the spirit of the invention. Accordingly, such modifications and changes are considered to be within the scope of the appended claims.

What is claimed is:

1. A method for producing an abrasion resistant coating composed of a ceramic/metal material system or a ceramic/ceramic material system, the method comprising the steps of:
   blending micron-scale particles of a hard phase material arranged in particle aggregates with nano-scale particles of a binder phase material to form a uniform powder mixture;
   aggregating the powder mixture to bond the nano-scale particles to the micron-scale particles thereby forming a feedstock powder comprised of aggregated particles; and
   thermal spraying the feedstock powder of particle aggregates onto a substrate thereby forming the abrasion resistant coating thereon, the coating composed of the micron-scale particles of the hard phase material fused together with the binder phase material.

2. The method according to claim 1, wherein the particles are different sizes.

3. The method according to claim 2, wherein the particles are different in composition.

4. The method according to claim 1, wherein the particles are different in composition.

5. The method according to claim 1, further comprising the step of agglomerating the powder mixture formed in the blending step prior to performing the aggregating step.

6. The method according to claim 5, wherein the agglomerating step is performed by spray drying and the particle aggregates are each about 5 to 50 microns in diameter.

7. The method according to claim 1, wherein the hard phase material includes one of a ceramic or a ceramic/metal composite.

8. The method according to claim 1, wherein the binder phase material include one of a metal, ceramic and ceramic/metal composite.

9. The method according to claim 1, wherein the micron-scale particles of the hard phase material comprises between 50 and 90 volume percent of the blended powder mixture.

10. The method according to claim 1, wherein the micron-scale particles of the hard phase material comprises 70 volume percent of the blended powder mixture.

11. The method according to claim 1, wherein tile aggregating step is performed by heat treating.

12. The method according to claim 1, wherein during the thermal spraying step the nano-scale particles of the binder phase material are selectively melted, tile melted particles filling pore spaces between heated and softened ones of the micron-scale particles, thereby effectively binding the micron-scale particles together and densifying the coating.

13. The method according to claim 12, wherein during the thermal spraying step the melted particles experience a cooling rate which generates one of an amorphous nanocrystalline or microcytalline binder phase.

14. The method according to claim 1, wherein the ceramic/metal material system is selected from the group consisting of WC/Co, $Cr_3C_2$/NiCr, TiC/Fe, metal boride/metal, and metal nitride/metal and the ceramic/ceramic material system is selected from the group consisting of $Al_2O_3$, YSZ, $Al_2O_3/TiO_2$, $ZrO_2/MgO$, and $Cr_2O_3/SiO_2$.

15. A method of making a feedstock powder for use in producing thermal spray abrasion resistant coatings composed of a ceramic/metal material system or a ceramic/ceramic material system, the method comprising the steps of:
   blending micron-scale particles of a hard phase material arranged in particle aggregates with nano-scale particles of a binder phase material to form a uniform powder mixture; and
   aggregating the powder mixture to bond the nano-scale particles to the micron-scale particles thereby forming particle aggregates.

16. The method according to claim 15, wherein the particles are different sizes.

17. The method according to claim 16, wherein the particles are different in composition.

18. The method according to claim 15, wherein the particles are different in composition.

19. The method according to claim 15, further comprising the step of agglomerating the powder mixture formed in the blending step prior performing the aggregating step.

20. The method according to claim 19, wherein the agglomerating step is performed by spray drying and the particle aggregates are each about 5 to 50 microns in diameter.

21. The method according to claim 15, wherein the hard phase material includes one of a ceramic or a ceramic/metal composite.

22. The method according to claim 15, wherein the binder phase material includes one of a metal, ceramic and ceramic/metal composite.

23. The method according to claim 15, wherein the micron-scale particles of the hard phase material comprises between 50 and 90 volume percent of the blended powder mixture.

24. The method according to claim 15, wherein the micron-scale particles of the hard phase material comprises 70 volume percent of the blended powder mixture.

25. The method according to claim 15, wherein the aggregating step is performed by heat treating.

26. The method according to claim 15, wherein the ceramic/metal material system is selected from the group consisting of WC/Co, $Cr_3C_2$/NiCr, TiC/Fe, metal boride/metal, and metal nitride/metal and the ceramic/ceramic material system is selected from the group consisting of $Al_2O_3$, YSZ, $Al_2O_3/TiO_2$, $ZrO_2/MgO$, and $Cr_2O_3/SiO_2$.

* * * * *